June 28, 1932.  H. V. WODTKE  1,865,415
ELECTRICAL CABLE AND METHOD FOR MANUFACTURING THE SAME
Filed April 7, 1923    4 Sheets-Sheet 4
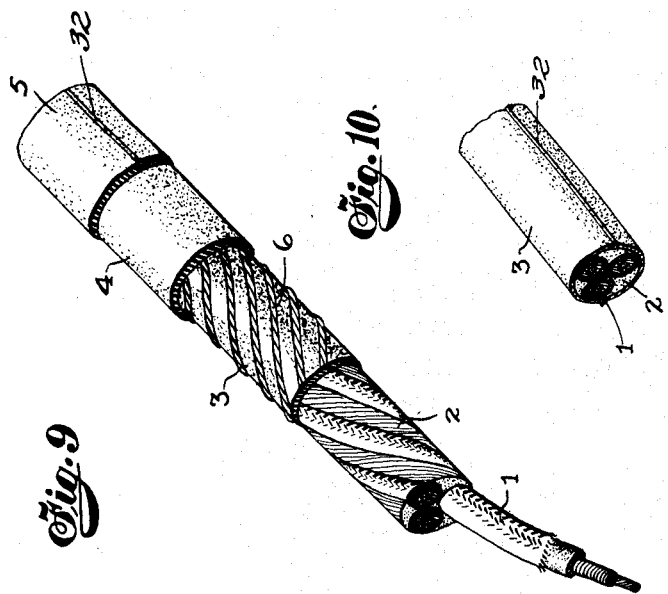
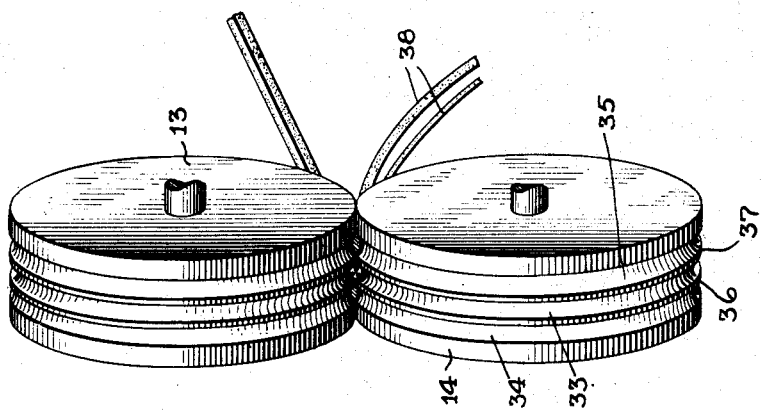
INVENTOR
Hans V. Wodtke
BY
Emery Booth Janney Varney
his ATTORNEYS Patented June 28, 1932

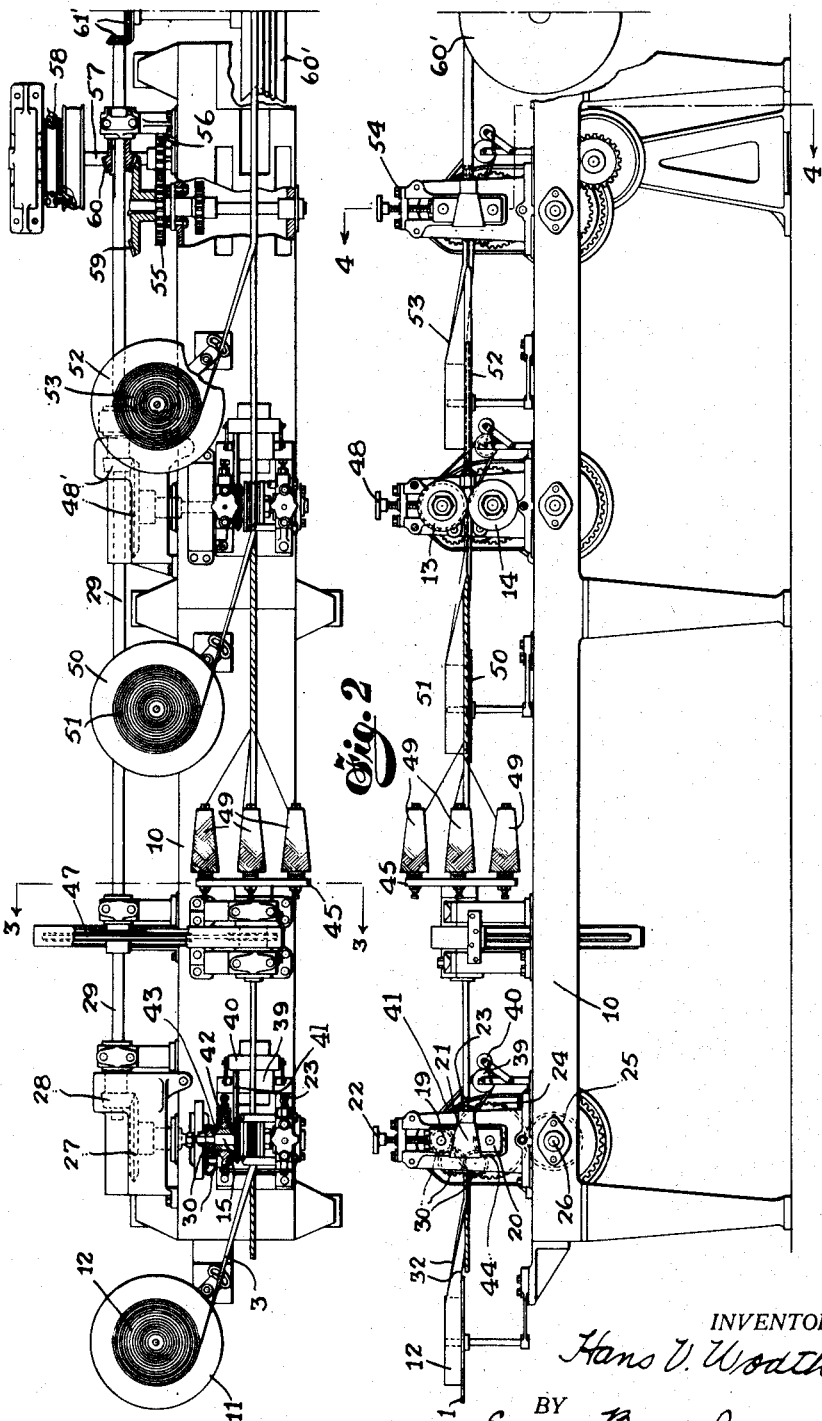

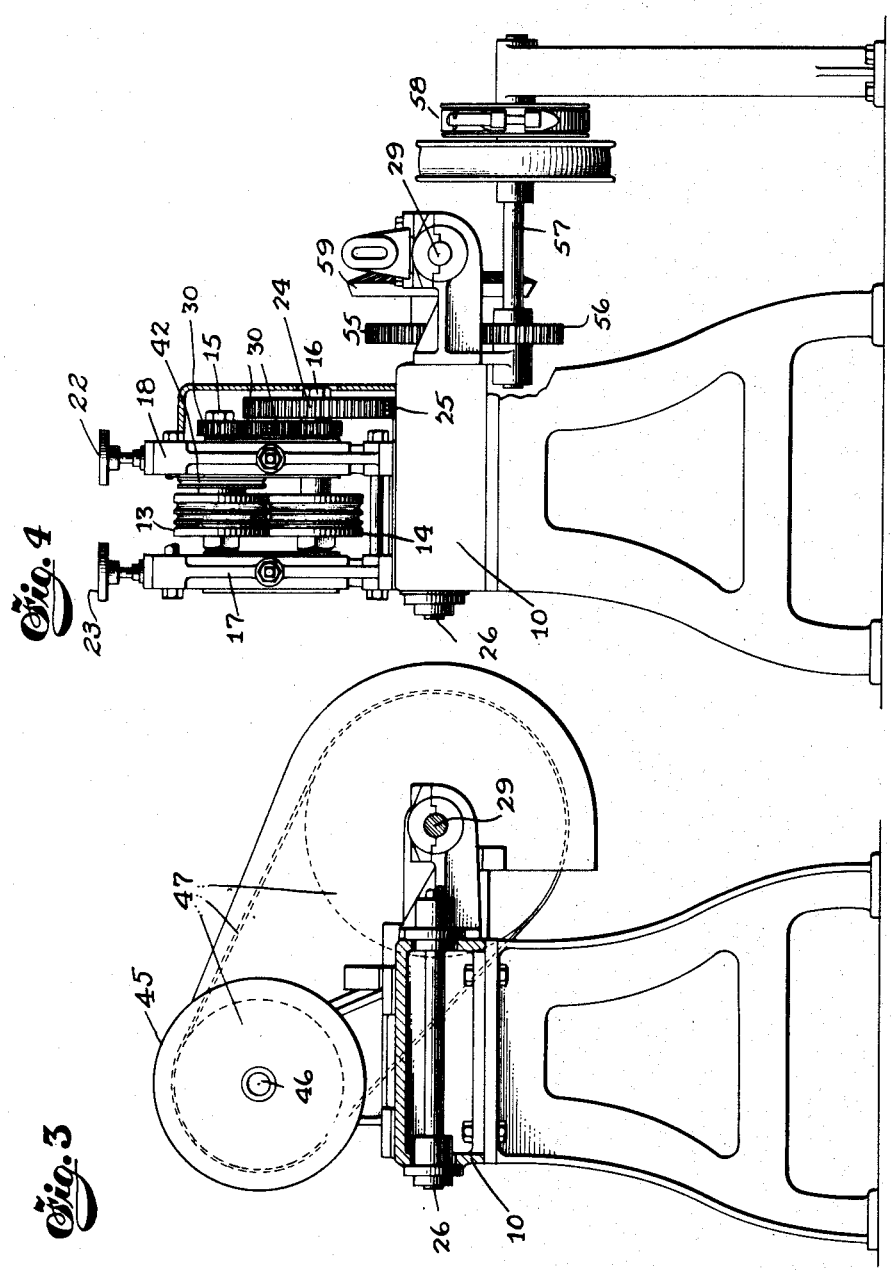

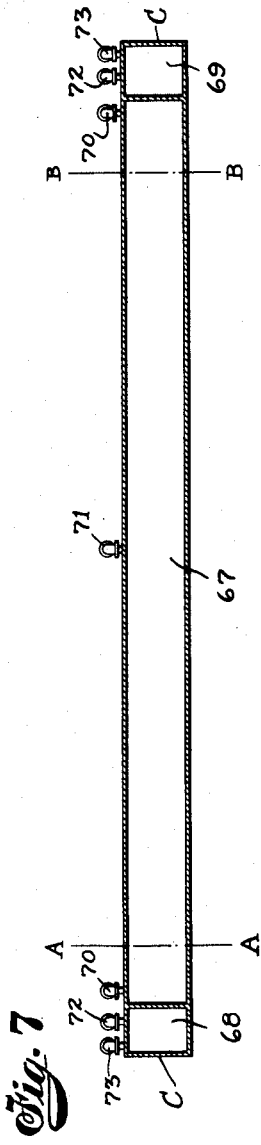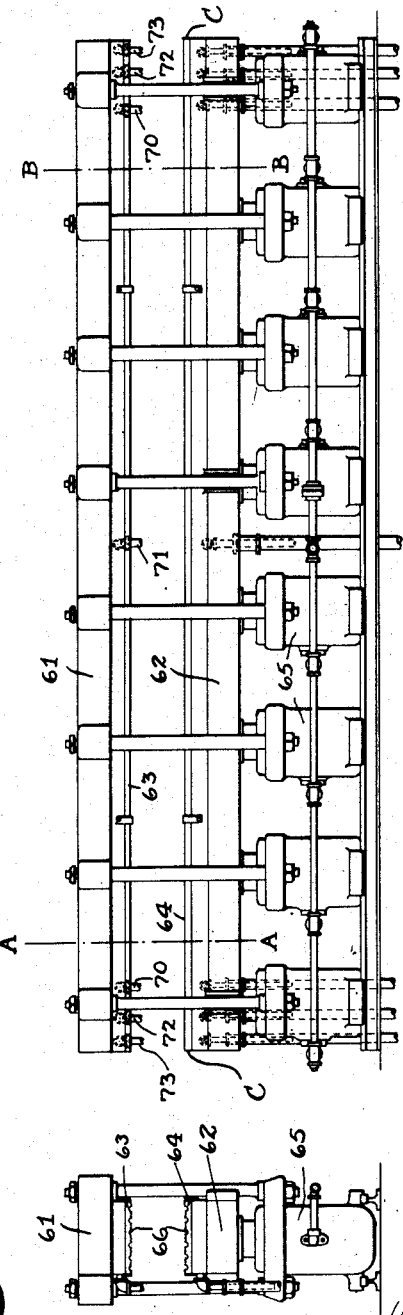

1,865,415

UNITED STATES PATENT OFFICE

HANS V. WODTKE, OF BUFFALO, NEW YORK, ASSIGNOR, BY MESNE ASSIGNMENTS, TO GENERAL CABLE CORPORATION, OF NEW YORK, N. Y., A CORPORATION OF NEW JERSEY

ELECTRICAL CABLE AND METHOD FOR MANUFACTURING THE SAME

Application filed April 7, 1923. Serial No. 630,459.

The present invention relates to improvements in the art of manufacturing electrical cables having a plastic covering of rubber compound or the like and to the article itself.

The invention is illustrated in connection with an electrical cable which consists of a core, comprising a plurality of twisted insulated conductors with fillers arranged therebetween to round out the core, and a covering made up of a plurality of layers of rubber compound vulcanized together and onto the core with a reinforcing ligature arranged between the adjacent layers of the rubber. It should be understood, however, that the invention is not limited to the production of this particular cable, as the method may be used to produce cables of various other constructions, as will appear later in the description.

This application is related to my copending application Serial Number 629,406, filed April 2, 1923, the present application being directed more particularly to the cable making art while the other application is directed more particularly to the molding art in general.

In the drawings:

Fig. 1 is a plan view of the mechanism for covering the core;

Fig. 2 is a side elevation of this mechanism with parts broken away to more clearly disclose the construction;

Fig. 3 is a vertical sectional view on the line 3—3 of Fig. 1 but on a larger scale than Figures 1 and 2;

Fig. 4 is a similar view on the irregular line 4—4 of Fig. 2;

Fig. 5 is a side elevation of the vulcanizing mechanism;

Fig. 6 is an end view thereof;

Fig. 7 is a horizontal section through one of the heating elements for the mold plates;

Fig. 8 is an enlarged perspective view of the rolls for forming the rubber on the core and removing the surplus.

Fig. 9 is a detail perspective view of the particular form of cable which is selected for the illustration of this invention with successive layers progressively removed to show the interior construction; and Fig. 10 is a detail showing the manner in which the covering of rubber compound is applied to the core.

The cable illustrated in the drawings (Figs. 9 and 10) in progressively broken away sections includes a core comprising insulated twisted conductors 1 between which fillers 2 are arranged to round out the core. The covering for this core includes a plurality of layers of rubber indicated in the drawings by the characters 3, 4 and 5. Ligatures 6 which are for the purpose of increasing the tensile strength of the cable are arranged between two of the layers of rubber.

The illustrated form of the mechanism for applying the covering to the core which is shown in Figs. 1 and 2 includes a bed 10, at the left or incoming end of which is located a reel 11 adapted to support a rolled strip 12 of uncured rubber compound which subsequently forms the preliminary covering for the core. Mechanism for applying this preliminary covering to the core, and for removing the surplus compound therefrom is supported on the bed 10 adjacent to the reel 11. This mechanism includes a pair of cooperating removable rolls 13 and 14, supported on shafts 15 and 16, which have their bearings in standards 17 and 18. Bearings 19 and 20 are vertically movable within the standards 17 and 18 and are removable therefrom to permit the substitution of other rolls when it is desired to operate on a different size or character of cable. The adjustment of these rolls and the securement of the same in their adjusted positions is attained by means of wedge blocks 21, and set screws 22 and 23.

The shafts 15 and 16, and consequently the rolls 13 and 14 mounted thereon, are driven in opposite directions, the roll 14 being driven by a gear 24 which receives its motion from a cooperating gear 25 mounted on a shaft 26, as shown in dotted lines in Fig. 2, extending transversely of and mounted in bearings on the bed, which shaft is actuated by bevel gear 27. This latter gear receives its motion through a pinion connection 28 with a driven shaft 29, which shaft is actuated in a manner later to be described. The upper roll 13 is rotated by a train of gears 30 between the shafts 15 and 16.

The core of the cable (see Fig. 9) is fed to this mechanism and the uncured rubber compound from the reel 11 is folded around the core before it reaches the mechanism. This covering 3 (see Fig. 10) is applied longitudinally to the core so that the meeting edges 32 extend along one side thereof. In the case of larger cables two strips of covering compound may be used to form each sheath. The rolls 13 and 14 are each provided with an intermediate groove 33 and with side grooves 34 and 35, the grooves being separated by ridges 36 and 37.

The core to which the preliminary covering 3 has been applied is fed to the rolls 13 and 14, the core itself passing between the cooperating grooves 33 of the two rolls. The excess rubber which is present at the meeting edges 32 on one side of the core is pinched off by the cooperating ridges 37, the excess passing between the rolls through the cooperating grooves 35. The opposite side of the covering is pinched between the cooperating ridges 36, so that the covering is drawn tightly about the core, the excess rubber which is pinched off of this side of the covering passing between the rolls in the grooves 34.

These excess strips of the rubber covering which are represented at 38 in Fig. 8 of the drawings pass downwardly after leaving the rolls 13 and 14, are stripped from the cable, and are fed away by a pair of cooperating rollers 39 and 40, the roller 39 being positively driven and the roller 40 being spring pressed against the former. This roller 39 is driven by a belt 41, which receives its motion from a pulley 42 mounted inside the end of the bearing 43 shown on the left hand of Fig. 1, and rigidly secured to shaft 15 adjacent the roll 13.

Means, which is supported on the bed 10 and located in spaced relation to the mechanism just described, is provided for applying ligatures 6 over the preliminary rubber covering of the core after the latter is fed through the first rolls 13 and 14. This means includes a revoluble plate 45 which is mounted on a hollow shaft 46, the latter being driven by a belt and pulley connection 47 with the driven shaft 29. The plate 45 is provided with an opening which is aligned with the opening of the hollow shaft 46. The covered core is fed from the rolls 13 and 14 through the hollow shaft and through the opening in the plate.

Arranged concentrically on the plate 45 is a series of spools 49 which bear the ligatures and which upon the revolution of the plate and the longitudinal movement of the cable along the mechanism apply the ligatures to the outside of the preliminary rubber covering and under tension, preferably in a convolute form.

Located between these ligature bearing spools and a second mechanism 48 for applying a second layer of rubber and removing the surplus is a second reel 50 which supports a second roll of uncured rubber tape 51. This tape is applied to the moving cable over the ligatures which have been applied to the preliminary covered core. This mechanism 48 is actuated by a gear connection 48' with the shaft 29.

A third tape supply roll 52 having uncured rubber tape 53 thereon is located beyond the mechanism 48, and supplies another layer of rubber to the cable. This covering is applied and the surplus rubber removed by a third mechanism 54, which is similar to the previously described rubber applying and removing mechanisms but is driven by a pair of intermeshing gears 55 and 56, the former being mounted on the lower roll shaft and the latter on a shaft 57 which is provided with a clutch 58. The driven shaft 29 is actuated from the lower roll shaft of this rubber removing mechanism by a bevel gear 59 which intermeshes with a pinion 60.

The arrangement of mechanisms illustrated is for the purpose of forming the particular cable illustrated but it is to be understood that if it is desired to increase the thickness of the rubber covering or the number of ligatures the mechanisms for applying the same may be rearranged accordingly.

The cable passes around a driving sheave 60', which is positively driven by the shaft 29 through a gear connection 61'. From the driving sheave 60', the cable passes to a reel, not shown, on which it is wound. The driving sheave 60' thus cooperates with the covering rolls to draw the cable through the various rubber and ligature applying mechanisms.

The rubber covered and ligature bound core, after being wound on the reel, not shown, is subjected to the action of a vulcanizing mechanism such as shown in Figs. 5, 6 and 7, where the rubber is cured so that the ligature and all of the several covering elements become an integral cover and so that the cover and core are unified.

This mechanism includes relatively movable platens 61 and 62 carrying mold plates 63 and 64, the platens being forced together by suitable mechanism which is illustrated in the drawings as hydraulic rams 65.

The mold plates are each provided with at least one groove 66, the corresponding grooves in the plates cooperating to form a complete mold for the cable.

The platens are provided with intermediate heating chambers 67 and end chambers 68 and 69. A circulation of a heat exchange medium such as steam is maintained through the intermediate chambers by conduits 70 and 71. The end chambers 68 and 69 are each provided with an inlet conduit 72 and an outlet conduit 73. A heat exchange medium such as water is circulated through the chamber 68 at the incoming end of the mechanism and may be circulated through the chamber 69 at the outgoing end of the mechanism.

Satisfactory vulcanization of the rubber compound has, however, been obtained when steam is circulated through the chambers 67, water circulated through the chambers 68, and the chambers 69 supplied with air.

The result of the heating of the chambers 67, 68 and 69 is the raising of the temperature of the mold plates and the gradual reduction or tapering off of the temperature toward the ends of the plates. The temperature of the mold plates between the chambers 68, 68 rises gradually from the extreme outer ends of the plates throughout the length of the chambers 68 to a line over the steam chambers 67 which may be approximately indicated by the line A—A. At the other end the temperature is gradually reduced from a line approximately indicated by the line B—B over the steam chamber 67 to the outer end of the mold plates.

In carrying out the vulcanizing phase of this method an integral section of the cable, equal in length to that of the mold plates, is placed between the plates in one of the grooves. The plates, being heated, are forced toward each other until they compress the rubber covering and are thus maintained until the vulcanization is completed, the pressure being continuously exerted. The succeeding sections are then drawn between the plates and vulcanized. A plurality of cables are thus treated simultaneously.

The cable which is placed between the mold plates is larger than the molds in which it is vulcanized, so that during the vulcanization and the exertion of the pressure by the mold plates some of the rubber exudes between the ridges of the plates in thin sheets which extend longitudinally along the sides of the cable after the vulcanization has been completed. As the rubber softens the thin ridges are forced closer together making it increasingly difficult for the rubber to escape. Thus the tendency of the rubber to expand internally by the formation of numerous air pockets is counteracted because as soon as the air pockets begin to form they are immediately closed by the constantly acting hydraulic pressure. With a bolted-up mold the air pockets are free to expand by merely forcing softened rubber out through the same sized egress space as existed when the rubber was colder and harder.

The bulk of these sheets of excess rubber is stripped from the cable after its vulcanization has been completed but there inevitably remains on the sides of the cable thin ridges or fins which are among the distinguishing features of the cable made in accordance with the present invention.

When after the curing of a section of the covering the next adjoining section is moved into position between the mold plates, the point on the cable which is located at the outer end of the chamber 68 at the incoming end of the machine where the temperature is the lowest, which point is marked C (Fig. 7), is drawn through between the mold plates to the line B—B at the outgoing end of the machine, where the temperature of the mold plates over the steam chamber 67 just begins to reduce. Thus the portion of the rubber which is subjected to the greatest heat adjacent the incoming end of the machine is subjected to the least heat at the outgoing end, and that which is subjected to the least heat at the incoming end of the machine is subjected to the greatest heat at the outgoing end. This step-by-step vulcanizing action is repeated until the covering of the entire cable has been vulcanized.

This graduation or tapering off of the temperature of the mold plates results in the production of a vulcanized covering which is substantially uniform in character, there being no definite lines of demarcation between the successively vulcanized sections, but the character of the rubber between the vulcanized sections being substantially the same as that of the sections.

Furthermore, the vulcanization of the covering under pressure forms the several layers of rubber covering into a homogeneous mass, in which is imbedded the ligatures 7. It also causes the unification of the cable, that is to say, causes the adhesion of the covering to the core and the permanent positioning of the core within the covering.

Careful examination and test of insulated electrical cables manufactured in accordance with this invention reveal certain characteristics, among them being that the product is of uniform cross-sectional dimension, has a relatively hard, smooth surface, and has each element which goes to make up the cable firmly compacted and united into a homogeneous mass, which is to be distinguished from a product made up of the same elements but finished in bolted-up molds or by the so-called open steam cure. In the latter case the covering of rubber compound is not of uniform dimension and shows the effects of gassing during vulcanization; the surface being pitted and the compound containing internal pockets of gas. By the method of vulcanization disclosed herein the tensile strength of the compound is very materially increased, this increase running as high as thirty-five percent. Furthermore, the several layers of compound cannot be separated or the compound separated from the core except by extreme manual force, whereas a similar structure vulcanized in the open steam cure will readily peel away from the core and the several layers will readily separate. As further indicating the superior character of the product of the present invention over the product of the open steam cure, it is noted that the specific gravity of the entire cable is increased from one to one and one-half percent and the specific gravity of the rubber compound is increased by as much as three-tenths of one percent. The durability of the outer covering is also improved, as is indicated by the fact that the puncture resisting qualities are increased by as much as sixteen percent.

While particular embodiments of the invention have been described, it is to be understood that the various changes in details may be made in the machine and in the method and also in the construction of the cable itself within the scope of the subjoined claims.

Claims:

1. The method of forming an electrical cable including a core and a covering therefor, which includes applying a rubber covering to the core, drawing the cover tightly on the core and removing the excess rubber therefrom, applying a ligature to said covering, applying a rubber covering over said ligature, drawing the cover tightly and removing the excess rubber therefrom, and subsequently curing the rubber covering under pressure between heated platens subject to a continuously applied external force active throughout the period of vulcanization to reduce the size of the covering.

2. An electrical cable comprising a core and a covering therefor consisting of a plurality of layers of rubber compacted and vulcanized together between platens under live controllable resilient pressure.

3. An electrical cable comprising a core and a covering of rubber compressed and vulcanized in a mold under live resilient controllable pressure with the greatest cross sectional dimension of the cable at the juncture of the molds.

4. An electrical cable including a core and a rubber covering molded thereon under active pressure sufficient to remove gaseous voids whenever formed and particularly during that part of the vulcanizing period when the covering is decreasing in volume, the finished covering being very dense and substantially without gas pockets or voids.

5. An electrical cable comprising a core and a covering therefor consisting of a plurality of layers of rubber and spaced ligatures embedded between the layers compacted and vulcanized together between platens under live controllable resilient pressure.

6. An electrical cable of indefinite length including a core and a rubber covering molded thereon in a mold of definite length under active pressure sufficient to remove gaseous voids whenever formed and particularly during that part of the vulcanizing period when the covering is decreasing in volume, the finished covering being very dense and substantially without gas pockets or voids and being of substantially uniform character throughout its length though molded in a mold of less length than the cable.

In testimony whereof, I have signed my name to this specification this 4th day of April, 1923.

HANS V. WODTKE.